Figure 1:
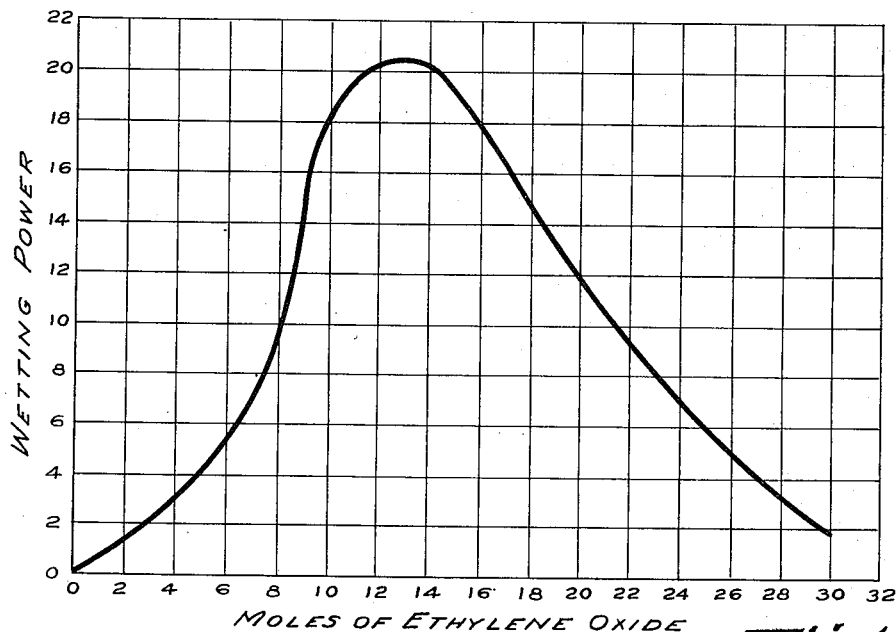

INVENTOR
JOSEPH J. CARNES,
BY
ATTORNEY

Patented Aug. 18, 1953

2,649,478

UNITED STATES PATENT OFFICE 2,649,478

LONG-CHAIN ALKYLBENZENESULFONAMIDE-ETHYLENE OXIDE CONDENSATION PRODUCTS

Joseph J. Carnes, Greenwich, Conn., assignor to American Cyanamid Company, New York, N. Y., a corporation of Maine Application June 22, 1949, Serial No. 100,658

6 Claims. (Cl. 260—556)

This invention relates to a new class of non-ionic surface-active agents containing an alkylbenzenesulfonamide-ethylene oxide condensation product as the essential surface-active ingredient, and to methods of producing these compounds.

Non-ionic surface active agents are used commercially for a number of purposes where an anionic wetting agent is undesirable. In general, the non-ionic compounds do not have very strong wetting or detergent properties, since they do not ionize in aqueous solution. I have found, however, that certain ethylene oxide condensation products of alkylbenzenesulfonamides containing a single long aliphatic radical of about 8–18 carbon atoms, with or without one or two additional short chain hydrocarbon substituents on the benzene nucleus, possess unexpectedly good surface active properties. The compounds of this class containing from about 6 to 25 mols of combined ethylene oxide for each mol of alkylbenzenesulfonamide are, in general, good wetting agents; those compounds which contain from about 10 to about 50 mols of combined ethylene oxide possess good detergent properties.

The principal object of the present invention is, therefore, the production of a class of alkylbenzenesulfonamide-ethylene oxide condensation products of good wetting and detergent power which can be produced from commercially available raw materials by a relatively inexpensive manufacturing process.

The alkylbenzenes from which the compounds of the present invention are produced are ordinarily prepared in commercial quantities by one of two methods; either by condensing an olefin of about 8–18 carbon atoms such as a propylene or butylene polymer with benzene, toluene or xylene, or by condensing any one or more of these aromatic hydrocarbons with a chlorinated aliphatic hydrocarbon fraction of comparable molecular weight, such as a chlorinated kerosene fraction of 10–16 carbon atoms, usually with the aid of an aluminum chloride catalyst. The resulting alkylbenzene is converted into the corresponding sulfonamide by first reacting it with chlorosulfonic acid and then reacting the product with ammonium hydroxide. By this procedure the alkylbenzenesulfonamides are produced which constitute starting materials for use in preparing the compounds of the present invention.

I have found that the alkylbenzenesulfonamides containing a single long alkyl radical of 8–18 carbon atoms can be condensed with any desired quantity of ethylene oxide by carrying out the condensation reaction in the presence of an alkaline catalyst, preferably with the use of a polar solvent such as an aliphatic alcohol of 1–4 carbon atoms. Lower aliphatic amines such as dimethylamine, trimethylamine, monoethylamine, diethylamine or triethylamine may be used as the catalyst, or sodium or potassium hydroxide or alkali metal alcoholates such as sodium butoxide may be employed. In the presence of these catalysts the ethylene oxide condensation proceeds smoothly at atmospheric pressures when reaction temperatures of 60–90° C. are employed, although higher temperatures up to 130° C. and superatmospheric pressures may be used if desired. Water-soluble products are obtained when a minimum of about 6–8 mols of ethylene oxide per mol of alkylbenzenesulfonamide is condensed and for some purposes, notably for the production of wetting agents, compounds containing these minimum quantities of ethylene oxide are of value. For most purposes, however, the preferred quantities of condensed ethylene oxide are from about 8 to about 25 mols for each mol of the sulfonamide. As is noted above, compounds having good detergent properties are obtained when as much as 50 mols of ethylene oxide per mol of sulfonamide are condensed, and in special cases, as where compounds having a high degree of water solubility are desired, as much as 100 mols of ethylene oxide per mol of alkylbenzenesulfonamide may be employed.

The novel condensation products of the present invention, and particularly those containing 10 or more mols of combined ethylene oxide per mol of product, are soluble in and resistant to both acids and alkalis and are therefore useful in dyeing processes such as acetate dyeing, which is carried out in the presence of alkali, and metachrome dyeing in which sulfuric acid is ordinarily employed. They are also useful as ordinary household detergents, including particularly dish washing compounds, and can also be employed as foaming agents in the manufacture of wall board, sponge rubber and the like.

The invention will be further described by the following specific examples. It should be understood, however, that although these examples may describe in detail some of the more specific features of the invention, they are given primarily for purposes of illustration and the invention in its broader aspects is not limited thereto.

*Example 1*

An alkylbenzene prepared by condensing benzene with a propylene polymer fraction ranging from $C_{10}H_{22}$ to $C_{14}H_{30}$ and having an average molecular weight of 168 was used. This hydrocarbon was cooled to 15–20° C. and 2.8 mols of chlorosulfonic acid per mol of hydrocarbon was added slowly with stirring and cooling during one hour. After stirring for an additional hour to complete the evolution of hydrochloric acid the mixture was poured into ice and water. The oily layer of alkylbenzenesulfonyl chloride was extracted with heptane and washed with water, dried with calcium chloride, filtered and stripped of solvent by distillation under reduced pressure. The product was obtained as a dark green viscous oil.

A portion of the alkylbenzenesulfonyl chloride so obtained, weighing 150 grams, was added with stirring and cooling to a solution of 400 cc. of concentrated (28%) aqueous ammonia and 100 cc. of ethanol and the mixture was allowed to stand for 16 hours at room temperature. The heavier alkylbenzenesulfonamide layer was separated, dissolved in benzene and washed several times with dilute hydrochloric acid. The benzene was then distilled off under reduced pressure leaving the sulfonamide as a viscous oil.

A solution of 102 grams of the alkylbenzenesulfonamide in 93 cc. of secondary butanol containing 8 cc. of triethylamine was heated to the 100–105° C. in a flask surmounted by a reflux condenser cooled with ice water. A stream of ethylene oxide gas was passed through the solution, maintained at 100–105° C., during six hours. The reaction mixture was then heated at 115–120° C. for 2 hours, after which it was stripped of volatiles by heating under reduced pressure. The resulting alkylbenzenesulfonamide-ethylene oxide condensation product was a brown viscous oil that was soluble in water to produce clear, light-yellow foaming solutions. It contained about 15 mols of combined ethylene oxide per molecule.

By following the same procedure but varying the quantity of ethylene oxide, products were prepared containing 5, 8, 10, 12, 20, 30 and 50 mols of combined ethylene oxide per molecule. These were tested for wetting power and for detergency.

The tests for wetting power made by the Draves test, which measures the sinking time of a standard skein of thread in water containing varying amounts of the wetting agent. On Fig. 1 of the attached drawing the results are shown as percent of the wetting power of sodium di-(2-ethylhexyl) sulfosuccinate, a well known anionic wetting agent which has a Draves sinking time of 30 seconds at 25° C. in an 0.02% water solution.

Figure 2:
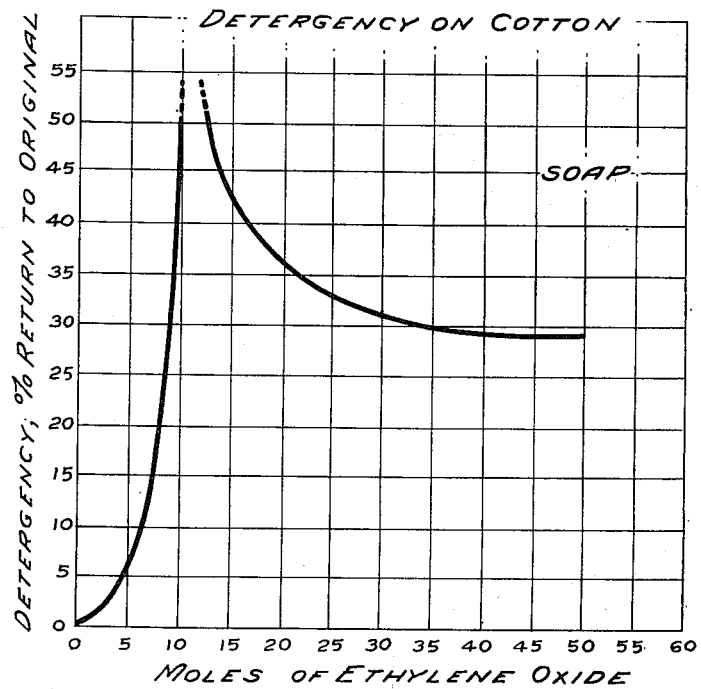

The detergency of the compounds on cotton is shown on Fig. 2 of the drawing. These values were obtained by running detergency tests of the compounds at 0.1% concentration in a launderometer by the standard A. A. T. C. C. procedure, using four inch squares of cotton cloth impregnated uniformly with a "standard soil" composed of carbon black, white mineral oil and lard. Reflectance measurements were taken of these squares at 600 millimicrons on a G. E. recording spectrophotometer before soiling, after soiling and after soiling and washing 3 times with 200 ml. of the detergent solutions at 110° F., the duration of each wash being 20 minutes. The percent of return of the cloth to its original reflectance, prior to application of the soil, is the measure of detergency. It will be noted that the compounds containing about 10–15 mols of combined ethylene oxide exhibited a higher detergency value than ordinary soap on this test.

Tests were also made of the calcium tolerance of 0.2% solutions of the wetting agents by titrating them with calcium chloride solution, with the following results:

| Mols Combined Ethylene Oxide | Ca Tolerance, p. p. m. |
| --- | --- |
| 5 | 200. |
| 8 | 500. |
| 10 | 800. |
| 12 | 1,400. |
| 14 and over | More than 2,200. |

These results show that the alkylbenzenesulfonamide-ethylene oxide condensation products containing from about 8 to about 22 mols of combined ethylene oxide are good non-ionic wetting agents, and that those containing about 8 to 50 mols of ethylene oxide have good detergency.

*Example 2*

An alkyltoluene having a composition approximating $C_{12}H_{23}.C_6H_4.CH_3$ is produced by condensing toluene with a propylene polymer fraction having an average molecular weight of 168 and is available commercially. As sulfonamide was prepared from this material by the procedure described in Example 1, and a series of ethylene oxide condensation products ranging from 5 to 50 mols of combined ethylene oxide for each mol of the sulfonamide was prepared and evaluated.

It was found that a minimum of from 6 to 8 mols of combined ethylene oxide was necessary to obtain a water-soluble product. Compounds having good wetting properties were obtained within the range of 6–25 mols of combined ethylene oxide, with maximum wetting power (20–28.5% of the wetting power of sodium dioctyl sulfosuccinate) occurring at 6–15 mols. The detergency on cotton was considerably better than in the products of Example 1; the percent return to original reflectance varied from a maximum of 71–77%, in compounds containing 6–8 mols of ethylene oxide, to about 50 in compounds in which the combined ethylene oxide was from 25 to 50 mols.

*Example 3*

An octyltoluene was prepared by condensing toluene with octene-1, using an aluminum chloride catalyst, and a 50 gram portion was added slowly to 86 grams of chlorosulfonic acid during about 20 minutes while maintaining the temperature at 20–25° C. The mixture was then stirred for an additional 20 minutes and was poured into a mixture of 180 cc. of concentrated ammonium hydroxide and 200 grams of cracked ice. After stirring for 5 minutes there was added 100 cc. of heptane to aid in separating the mixture into layers.

The organic layer was shaken with an additional 100 cc. of concentrated ammonium hydroxide and then allowed to stand several hours. It was then washed well with water, dried over anhydrous potassium carbonate and stripped by heating to 65° C. at 30 mm. of mercury pressure. The product was a viscous golden syrup weighing 65 grams.

A solution of 0.05 gram of metallic sodium in 60 cc. of secondary butyl alcohol was prepared and added to a 50 gram portion of the octyltoluenesulfonamide. The resulting solution was maintained at 80–90° C. and ethylene oxide gas was introduced at atmospheric pressure as described in Example 1. After the desired amount of ethylene oxide had been reacted the product was heated to 110–115° C. to complete the reaction. A clear red-brown liquid was obtained.

A series of products containing 4, 6, 8, 12, 18 and 25 mols of combined ethylene oxide per mol of octyltoluenesulfonamide was prepared in this manner and tested for wetting properties by the Draves test. The compound containing 8 mols of ethylene oxide had 30% of the wetting power of sodium dioctyl sulfosuccinate; those containing 6 and 12 mols were only slightly less effective as non-ionic wetting agents.

*Example 4*

A commercial grade of octadecylbenzene is produced by condensing a propylene polymer fraction having an average molecular weight of 252 with benzene, using a sulfuric acid catalyst. This product is a light yellow, fluorescent and slightly viscous oil.

A sample of this material weighing 91 grams was cooled to 15° C. and added slowly and with stirring to 88 grams of chlorosulfonic acid during about 30 minutes. The mixture was stirred for an additional one hour period while maintaining the temperature below 30° C. and was then poured into a mixture of ice and ammonia, extracted with heptane, washed with water, dried and stripped as in previous examples. The resulting octadecylbenzenesulfonamide was a dark brown viscous oil.

Samples of the product were condensed with 10 mols, 20 mols, 30 mols and 50 mols of ethylene oxide for each mol of the octadecylbenzenesulfonamide by the procedure previously described, using secondary butanol as solvent and triethylamine as catalyst. All four of the products were water-soluble; however, in no case was the wetting power as good as that of the corresponding dodecylbenzenesulfonamide-ethylene oxide condensation product. On the other hand, the detergency of the compounds containing 20, 30 and 50 mols of combined ethylene oxide was considerably better than the values found in the corresponding products of Example 1.

What I claim is:

1. The condensation product of from 6 to 50 mols of ethylene oxide with one mol of an alkylbenzenesulfonamide of the formula

in which R is an alkylbenzene nucleus containing a single long alkyl radical of 8 to 18 carbon atoms.

2. The condensation product of from 6 to 50 mols of ethylene oxide with one mol of an alkylbenzenesulfonamide of the formula

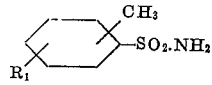

in which $R_1$ is an alkyl radical of 8 to 14 carbon atoms.

3. The condensation product of from 8 to 22 mols of ethylene oxide with one mol of an alkylbenzenesulfonamide of the formula

4. The condensation product of from 6 to 25 mols of ethylene oxide with one mol of an alkylbenzenesulfonamide of the formula

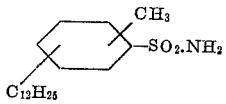

5. The condensation product of 8 mols of ethylene oxide with one mol of an alkylbenzenesulfonamide of the formula

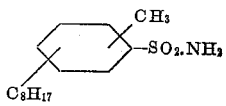

6. The product formed by condensing under alkaline conditions at an elevated temperature at least six mols of ethylene oxide with one mol of a primary long chain-alkylbenzenesulfonamide.

JOSEPH J. CARNES.

References Cited in the file of this patent

UNITED STATES PATENTS

| Number | Name | Date |
|---|---|---|
| 2,187,823 | Ulrich | Jan. 23, 1940 |
| 2,344,978 | De Groote et al | Mar. 28, 1944 |

FOREIGN PATENTS

| Number | Country | Date |
|---|---|---|
| 380,851 | Great Britain | Sept. 12, 1932 |
| 420,883 | Great Britain | Dec. 3, 1934 |
| 799,220 | France | Mar. 27, 1936 |
| 236,163 | Switzerland | June 1, 1945 |